US007720113B2

(12) United States Patent
Sakai et al.

(10) Patent No.: US 7,720,113 B2
(45) Date of Patent: May 18, 2010

(54) RECEIVING APPARATUS, RECEIVING SYSTEM USING SAME, AND RECEIVING METHOD THEREOF

(75) Inventors: Shunsuke Sakai, Osaka (JP); Yuji Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 557 days.

(21) Appl. No.: 11/547,282

(22) PCT Filed: Nov. 18, 2004

(86) PCT No.: PCT/JP2004/017155

§ 371 (c)(1),
(2), (4) Date: Oct. 4, 2006

(87) PCT Pub. No.: WO2005/104540

PCT Pub. Date: Nov. 3, 2005

(65) Prior Publication Data

US 2007/0274399 A1    Nov. 29, 2007

(30) Foreign Application Priority Data

Apr. 23, 2004    (JP) .............................. 2004-127469

(51) Int. Cl.
*H04J 3/02* (2006.01)
(52) U.S. Cl. .................... 370/537; 348/726; 725/70
(58) Field of Classification Search ................ 370/280, 370/294, 350, 358, 536, 537; 445/137; 375/260, 375/157, 530, 347, 349, 257, 305; 725/63; 327/20, 40, 296
See application file for complete search history.

(56) References Cited

U.S. PATENT DOCUMENTS

| 4,943,788 | A | * | 7/1990 | Laws et al. ................... 331/11 |
| 5,214,767 | A | * | 5/1993 | Wanner et al. ................ 710/22 |
| 5,742,680 | A | * | 4/1998 | Wilson ........................ 380/227 |

(Continued)

FOREIGN PATENT DOCUMENTS

JP    6-14308    6/1994

(Continued)

OTHER PUBLICATIONS

Sano, Seiichi, JPO Publication NumberJP 2004-072763 Machine Translation of Detailed Description, Retrieved from: http://www19.ipdl.inpit.go.jp/PA1/cgi-bin/PA1INIT?1195483568054 on Jun. 16, 2009.*

*Primary Examiner*—Huy D Vu
*Assistant Examiner*—James P Duffy
(74) *Attorney, Agent, or Firm*—Steptoe & Johnson LLP

(57) ABSTRACT

A receiving apparatus (100) includes demodulation parts (101, 102) for receiving the respective one of received signals of broadast systems to output demodulated data and timing clocks synchronized with the respective demodulated data, a clock generating part (103) for outputting, to an A/V decoder (107), the two timing clocks from the demodulation parts (101, 102) as high-rate and low-rate timing clocks and for outputting a control signal for multiplexing the two demodulated data from the demodulation parts (101, 102), and a multiplexing part (104) for multiplexing, based on the control signal, the two demodulated data to output the multiplexed data to the A/V decoder (107). The A/V decoder (107) receives the multiplexed data and timing clocks from the receiving apparatus (100) to process the video/audio signals of each broadcast.

12 Claims, 13 Drawing Sheets

U.S. PATENT DOCUMENTS

| | | | |
|---|---|---|---|
| 6,522,671 B1 * | 2/2003 | Solheim et al. | 370/535 |
| 6,563,346 B2 * | 5/2003 | Abbiate et al. | 327/48 |
| 6,721,957 B1 * | 4/2004 | Lawrence | 725/114 |

FOREIGN PATENT DOCUMENTS

| | | | |
|---|---|---|---|
| JP | 10-173623 | | 6/1998 |
| JP | 11-122556 | | 4/1999 |
| JP | 11122556 | * | 4/1999 |
| JP | 2002-185901 | | 6/2002 |
| JP | 200472763 A | * | 3/2004 |

* cited by examiner

RECEIVING APPARATUS, RECEIVING SYSTEM USING SAME, AND RECEIVING METHOD THEREOF

The present application is based on International Application PCT/JP2004/017155, filed Nov. 18, 2004, which claims priority to Japanese Patent Application No. 2004-127469, filed Apr. 23, 2004, the entire contents of which are hereby incorporated by reference.

TECHNICAL FIELD

The present invention relates to a receiving apparatus for receiving a plurality of digital broadcastings of different broadcast systems or same broadcast systems such as a satellite digital broadcasting or a ground digital broadcasting, and a receiving system using this receiving apparatus and a receiving method thereof.

BACKGROUND ART

Recently, the digitalization of broadcasts and communications have progressed with the advancement of digital transmission technology and a semiconductor integrated technology.

A receiving apparatus and a receiving system which simultaneously receive a plurality of broadcasts have a plurality of demodulation parts for demodulating a received signal in response to each broadcast system, a multiplexing part for multiplexing demodulated data outputted by respective demodulation parts, a multiplexed separating part for separating the demodulated data decoded from the demodulated data to be multiplexed thereby, and a decoding part for decoding the demodulated data separated by the multiplexed separating part.

An example of such a digital broadcasting apparatus is shown in JP-A-11-122556.

This well-known digital broadcasting receiver includes a demodulation part tuned to each broadcast system, a multiplexing part for receiving the demodulated data by the transport packet and multiplexing the demodulated data by the transport packet at a rate over a total of transport packet transmission rates of the respective broadcast systems, and a multiplexed separating part for separating decoded and demodulated data from the multiplexed demodulated data, so as to simultaneously receive a plurality of broadcast systems.

DISCLOSURE OF THE INVENTION

Problem to be Solved by the Invention

However, in a well-known digital broadcasting receiving apparatus, there was a problem that since a large-sized memory circuit such as a memory for delaying respective demodulated data was required and a size of the memory circuit was increased to multiplex the demodulated data outputted from a plurality of multiplexing parts in response to respective broadcast system at a rate over a total of transport packet transmission rates of the respective broadcast systems by the transport packet, the well-known digital broadcasting receiving apparatus was expensive. In addition, in well-known digital broadcasting receiving apparatuses, there was no system for multiplexing the demodulated data.

Consequently, an object of the present invention is to provide an inexpensive receiving apparatus capable of multiplexing two demodulated data using a small-sized circuit without using a large-sized memory, a receiving system using this receiving apparatus, and a receiving method thereof.

Means to Solve the Problem

In order to achieve the object, an apparatus includes two demodulation parts that respectively input received signals of respective broadcast systems and output demodulated data thereof. Timing clocks are respectively synchronized therewith. A clock generating part receives the two timing clocks outputted from the demodulation parts, and outputs the clocks to an A/V decoder as a high-rate timing clock and a low-rate timing clock. The clock generating part outputs control signals for multiplexing the two demodulated data outputted from the demodulation parts, and a multiplexing part multiplexes the two demodulated data and outputs them to the A/V decoder, based on the control signals. The A/V decoder processes audio/video signals of respective broadcastings by using the demodulated data and the timing clocks outputted from the receiving apparatus as the inputs.

ADVANTAGE OF THE INVENTION

With this configuration, two demodulated data can be multiplexed by adding a small-scale circuit without using a large-scale memory. The reduction in costs and power consumption can be realized by reducing the scale of the circuit, and timing clocks synchronized with the demodulated data can be synchronized with a single timing clock including higher-rate internal timing clock. Also, a timing restriction of a dowstream A/V decoder (video signal processing device) can be relaxed. Accordingly, the present invention has an advantage of constructing a more inexpensive system.

BEST MODE FOR CARRYING OUT THE INVENTION

Hereinafter, embodiments of the present invention will be described with reference to the drawings.

Embodiment 1

Figure 1:
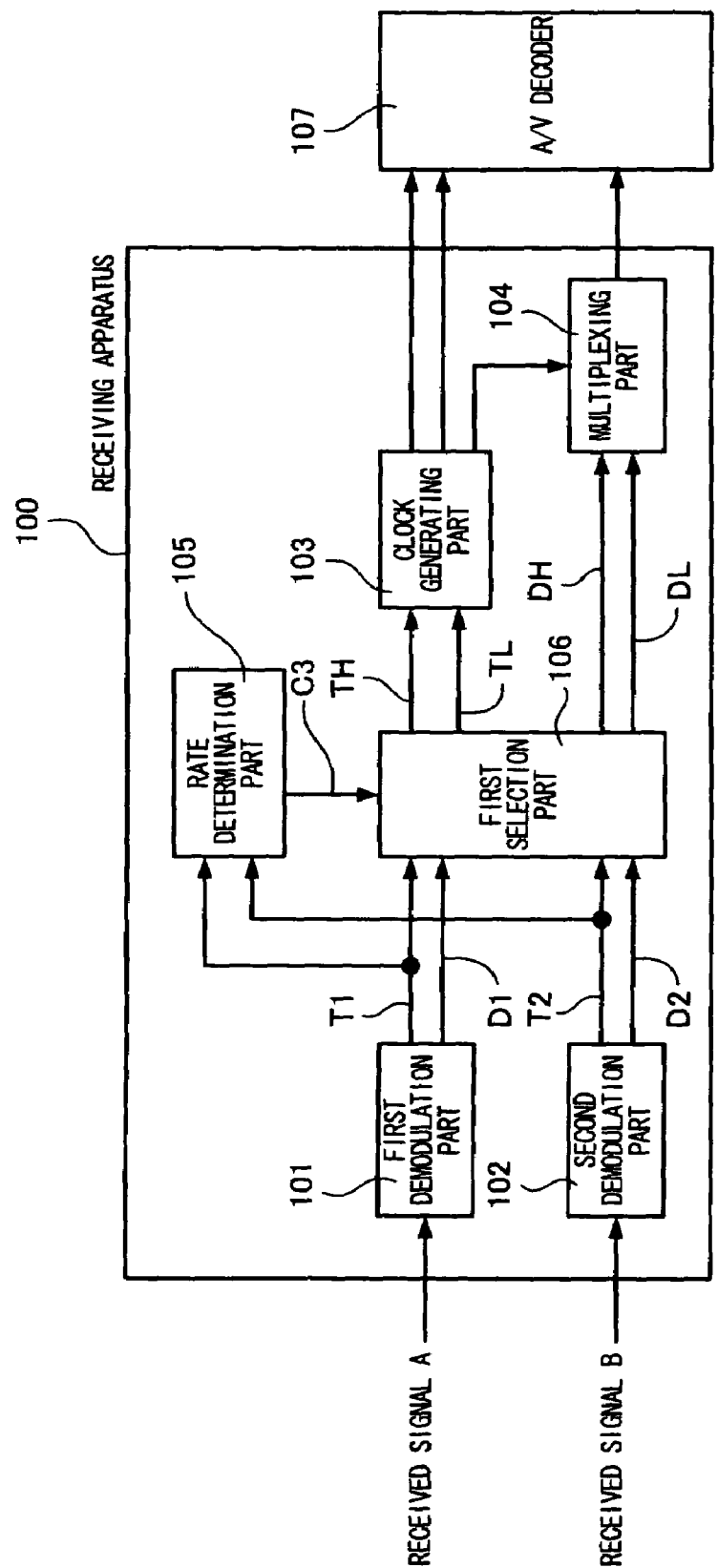
FIG. 1 is a block diagram of a receiving apparatus in embodiment 1 of the present invention.

FIG. 1 is a block diagram of a receiving apparatus in embodiment 1 of the present invention.

In FIG. 1, reference numeral 100 indicates a receiving apparatus. The receiving apparatus 100 receives two signals A and B of digital broadcasting from different broadcast systems or from a same broadcast system. The receiving apparatus outputs multiplexed data to multiplex the outputs of respective demodulated data, and high-rate timing clocks and low-rate timing clocks synchronized with the multiplexed data. In addition, reference numeral 107 indicates an A/V decoder (an example of a video signal processing device). The A/V decoder 107 separates the multiplexed data into two demodulated data for decoding, and uses any one or both of the two demodulated data so as to process an audio/video signal of each broadcasting by using the multiplexed data, high-rate timing clocks and low-rate timing clocks outputted from the receiving apparatus 100 as the inputs.

The receiving apparatus 100 includes a first demodulation part 101 and a second demodulation part 102, a rate determination part 105, a first selection part 106, a clock generating part 103, and a multiplexing part 104.

The first and second demodulation parts 101 and 102 respectively input the two received signals A and B, and output demodulated data D1 and D2 to the first selection part 106, and timing clocks T1 and T2 respectively synchronized therewith to the selection part 106 and the rate determination part 105.

The rate determination part 105 compares the respective rates of the two timing clocks T1 and T2 outputted from the first and second demodulation parts 101 and 102, determines which clock has the higher rate, and outputs the determination result to the first selection part 106 as a control signal C3.

The first selection part 106 selects either of the timing clocks T1 and T2 as a high-rate timing clock TH to output it to the clock generating part 103, and outputs the other one to the clock generating part 103 as the timing clock TL. The first selection part 106 further selects any one of the demodulated data D1 and D2 outputted from the first and second demodulation parts 101 and 102 as the high-rate demodulation data DH to output it to the multiplexing part 104, and outputs the other one to the multiplexing part 104 as the low-rate demodulated data DL based on a control signal C3 (determination result) outputted from the rate determination part 105.

The clock generating part 103 generates timing clocks of the demodulated data DH and DL (that is, the high-rate timing clock of the high-rate demodulated data DH and the low-rate timing clock of the low-rate demodulated data DL) to be multiplexed and output to the A/V decoder 107. The clock generating part 103 outputs control signals for multiplexing the two demodulated data DH and DL to the multiplexing part 104 by using the high-rate timing clock TH and the low-rate timing clock TL outputted from the first selection part 106 (based on the two timing clocks outputted from the demodulation parts 101 and 102) as the inputs.

The multiplexing part 104 multiplexes the demodulated data DH and DL outputted from the first selection part 106 byte-by-byte based on the control signals outputted from the clock generating part 103, and outputs the demodulated data to the A/V decoder 107.

Moreover, the first and second demodulation parts 101 and 102 are the demodulation parts suitable for the broadcasting systems of the respective received signals A and B.

Figure 2:
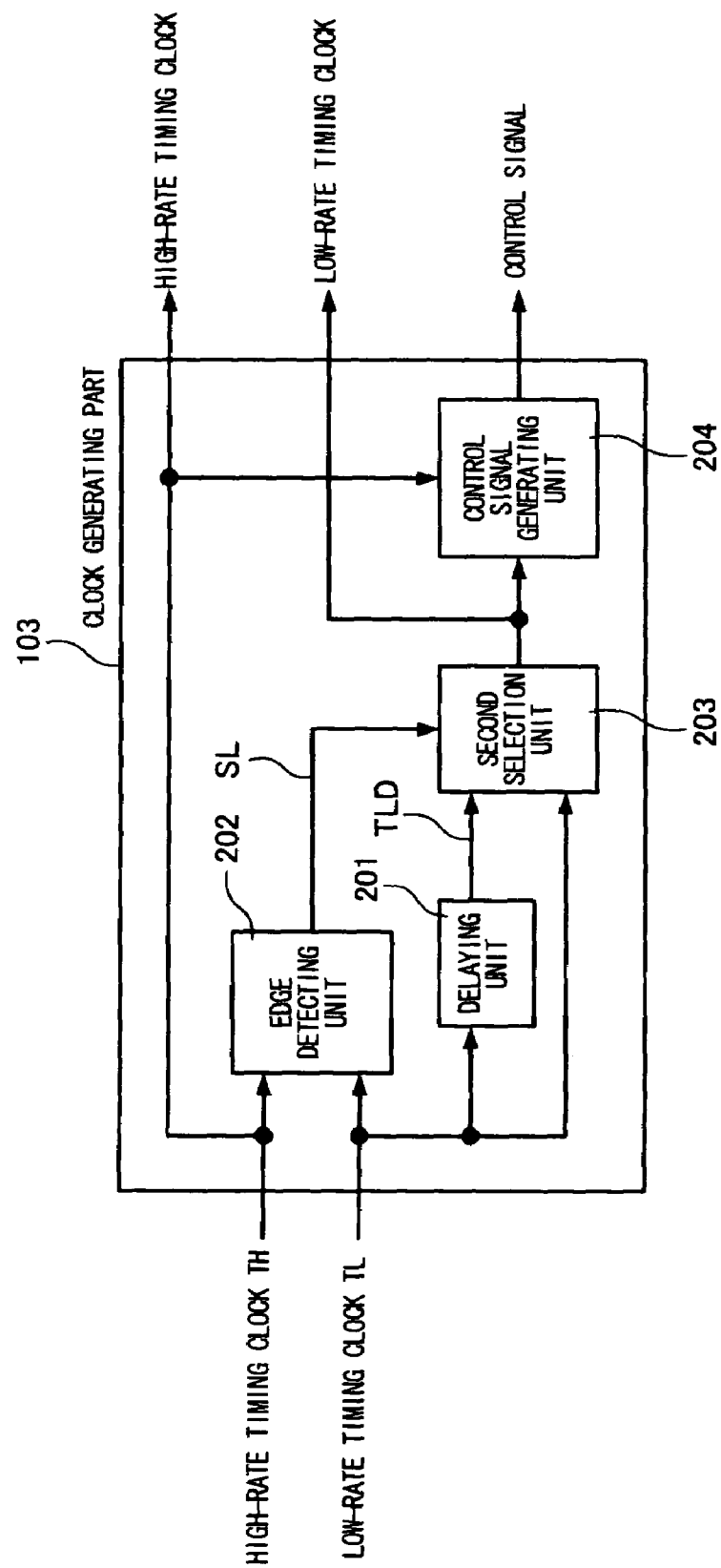
FIG. 2 is a block diagram of a clock generating part of the receiving apparatus.

FIG. 2 shows a circuit configuration more specific than that of the clock generating part 103.

The clock generating part 103 outputs the high-rate timing clock TH to the A/V decoder 107 as the high-rate timing clock as shown in FIG. 2 by using the high-rate timing clock TH and the low-rate timing clock TL outputted from the first selection part 106 as the inputs.

In addition, the clock generating part 103 includes a delaying unit 201, an edge detecting unit 202, a second selection unit 203 and a control signal generating unit 204, as shown in FIG. 2.

The delaying unit 201 inputs the low-rate timing clock TL for delaying and outputs the timing clock TLD to the second selection unit 203.

The edge detecting unit 202 detects simultaneous rises of the timing clocks, and outputs a logical value "1" (an example of a second logical value) when the rises are simultaneous and a logical value "0" (an example of an inverting value of the second logical value) when the rises are not simultaneous, to the second selection unit 203 as a selection signal SL by using the high-rate timing clock TH and the low-rate timing clock TL as the inputs.

The second selection unit 203 inputs the low-rate timing clock TL and the timing clock TLD outputted from the delaying unit 201 and selects one of the two timing clocks based on the selection signal SL. In other words, the second selection unit 203 selects the timing clock TLD delayed when the selection signal SL has a logical value "1" and selects the low-rate timing clock TL when the selection signal SL has a logical value "0", and outputs the low-rate timing clock TL to the control signal generating unit 204 and the A/V decoder 107 as the low-rate timing clock.

The control signal generating unit 204 inputs the low-rate timing clock and the high-rate timing clock TH outputted from the second selection unit 203 and outputs a logical value "1" (an example of a third logical value) when the high-rate timing clock TH rises and a logical value "0" (an example of an inverting value of the third logical value) when the low-rate timing clock rises. The control signal generating unit 204 holds the values when a rise does not exist. The control signal generating unit 204 outputs the "1" and "0" signals to the multiplexing part 104 as the control signal identifying the demodulated data DH and DL selected in the multiplexing part 104.

Figure 3:
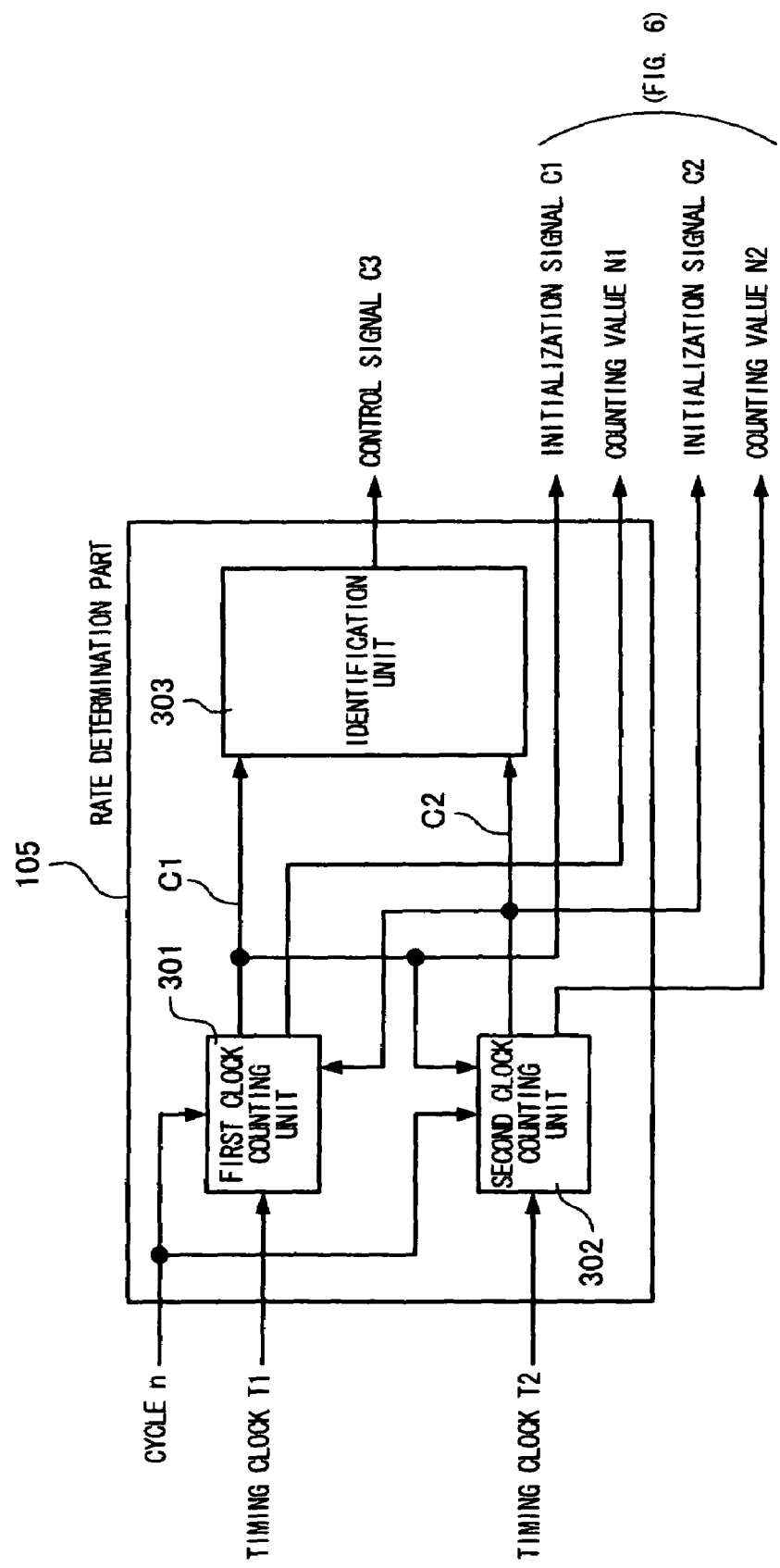
FIG. 3 is a block diagram of a rate determination part of the receiving apparatus.

In addition, FIG. 3 shows a more detailed view of the rate determination part 105.

The rate determination part 105 includes a first clock counting unit 301 and a second clock counting unit 302, and an identification unit 303, as shown in FIG. 3.

The first and second clock counting units 301 and 302 input the two timing clocks T1 and T2 respectively outputted from the first and second demodulation parts 101 and 102, count respective numbers N1 and N2 of rises (number of clocks) of the timing clocks T1 and T2, and output the respective initialization signals to the identification unit 303 as the control signals C1 and C2 at a predetermined cycle n, so as to initialize the timing clocks by the outputting of any one of the control signals (initialization signals) C1 and C2.

The identification unit 303 identifies the rate determination result, and outputs "1" (an example of a first logical value) when the control signal C1 is inputted to the first selection part 106 in advance or simultaneously and "0" (an example of the inverting value of the first logical value) when the control signal C2 is inputted in advance, as the control signal (identification signal) C3 outputted to the first selection part 106 by using the control signals C1 and C2 respectively outputted from the first and second clock counting units 301 and 302 as the inputs.

Moreover, the counting values N1 and N2 of the first and second clock counting units 301 and 302, and the control signals (initialization signals) C1 and C2 are outputted as shown in FIG. 3.

Figure 4:
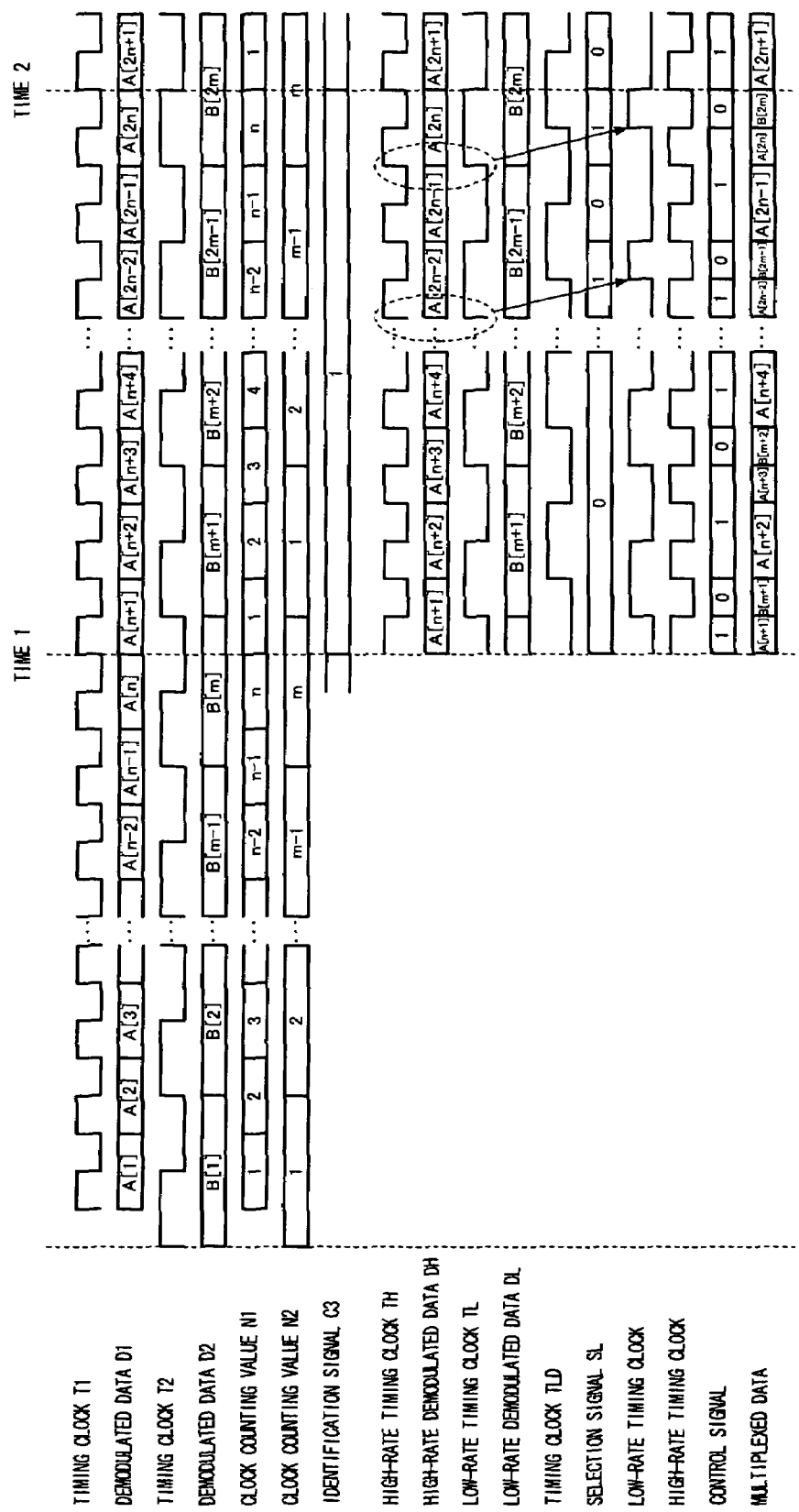
FIG. 4 is a timing diagram showing an operation of the receiving apparatus.
Figure 5:
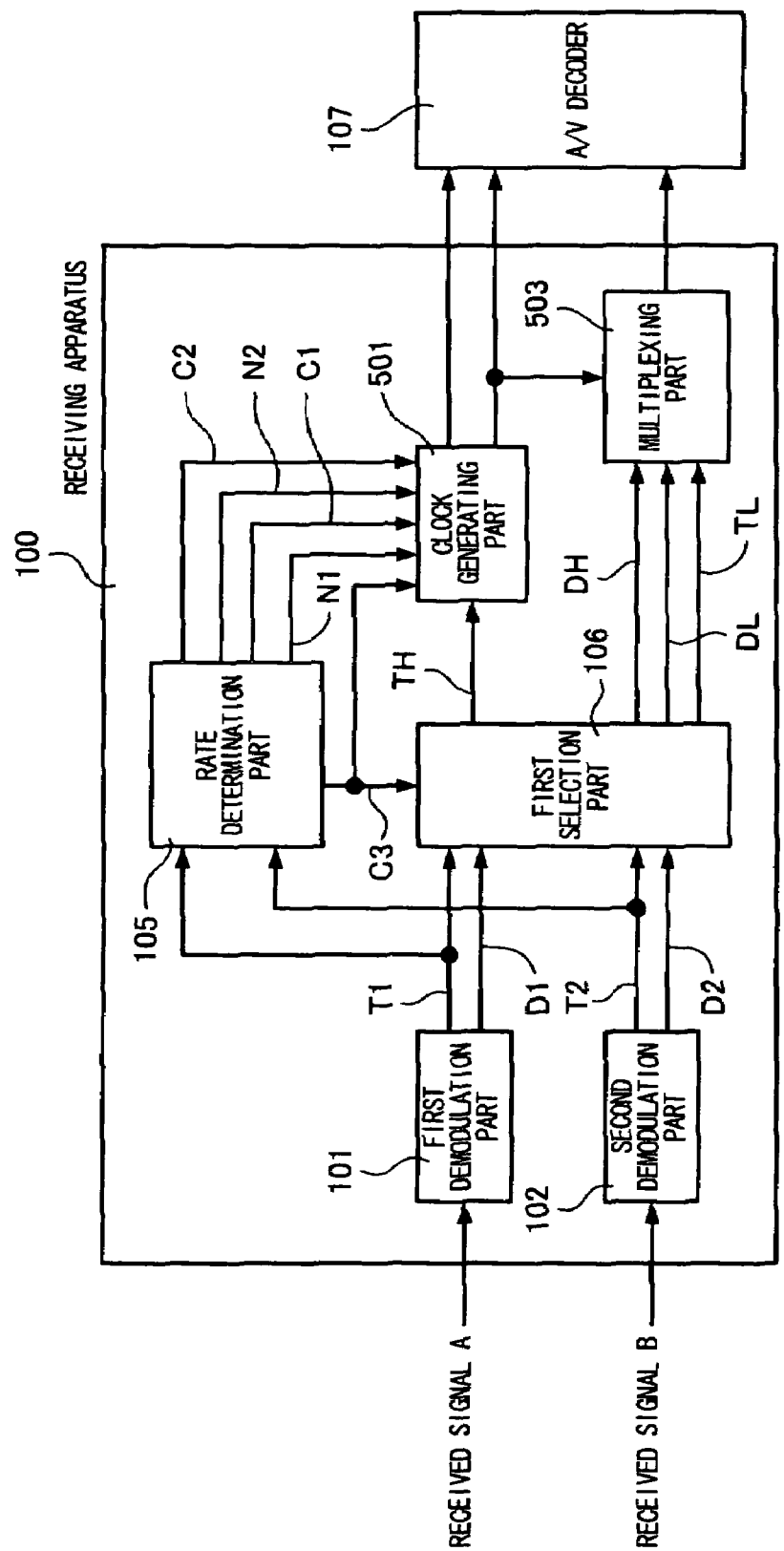
FIG. 5 is a block diagram of a receiving apparatus in embodiment 2 of the present invention.

Operations of the receiving apparatus configured as above will be described. FIG. 4 is a timing diagram of each part in the receiving apparatus 100 shown in FIG. 1.

The first demodulation part 101 performs a demodulation processing suitable for the broadcast system, and outputs the timing clock T1 and the demodulated data D1 (A[1], A[2], A[3], ...) synchronized therewith. In addition, the second demodulation part 102 performs the demodulation processing suitable for the broadcast system, and outputs the timing clock T2 and the demodulated data D2 (B[1], B[2], B[3], ...) synchronized therewith.

The clock counting units 301 and 302 of the rate determination part 105 counts the rises of the timing clocks T1 and T2, and the outputs N1 and N2 of the counting values increase as shown in FIG. 4. In addition, since the predetermined cycle has n, a logical value "1" is outputted as the control signals (initialization signals) C1 and C2 initializing the clock counting units 301 and 302 when N1 and N2 are the same as n (timing 1 and timing 2 in FIG. 4). Further, both of the clock counting units 301 and 302 are initialized at the time when the cycle n of any one of the clock counting units 301 and 302 is in n.

The identification unit 303 of the rate determination part 105 identifies which of clocks T1 and T2 has a high-rate output by determining which one of control signals C1 and C2 first reaches a logical value "1". The identification unit 303 then outputs a control signal C3 representing the result. In the embodiment 1, "1" is outputted as control signal C3 when the timing clock T1 is high-rate, that is, when the control signal C1 is received either before or simultaneously with C2. A "0" is outputted when the timing clock T2 is high-rate, that is, when the control signal C2 is received before C1.

The first selection part 106 outputs the timing clocks T1 and T2 as the high-rate timing clock TH and the low-rate timing clock TL, respectively when the logical value of the control signal C3 is "1", and outputs the demodulated data D1 and D2 as the high-rate demodulate data DH and the low-rate demodulated data DL, respectively, as shown in FIG. 4. In addition, the first selection part 106 operates conversely when the logical value of the control signal C3 is "0".

The clock generating part 103 outputs the inputted high-rate timing clock TH to the A/V decoder 107 as the high-rate timing clock without change.

The delaying unit 201 of the clock generating part 103 delays the low-rate timing clock TL to output the timing clock TLD. The edge detecting unit 202 compares the timing clocks TH and TL, and outputs a logical value "1" as the selection signal SL when the rises are simultaneous and a logical value "0" when the rises are not simultaneous. The second selection unit 203 selects the timing clock TLD delayed when the selection signal SL has the logical value "1" and the timing clock TL when the selection signal SL has the logical value "0", so as to output the selected timing clocks to the A/V decoder as the low-rate timing clock.

The control signal generating unit 204 of the clock generating part 103 outputs a logical value "1" as the control signal outputted to the multiplexing part 104 when the high-rate timing clock rises and a logical value "0" when the low-rate timing clock rises. The control signal generating unit 204 holds the values when a rise does not exist.

The multiplexing part 104 selects the high-rate demodulated data DH when the control signal outputted from the control signal generating unit 204 has a logical value "1" and the low-rate demodulate data DL when the control signal outputted from the control signal generating unit 204 has a logical value "0", and generates the multiplexed data from the demodulated data DH and DL as shown in FIG. 4, so as to output them to the A/V decoder 107.

As shown above, in embodiment 1, since the two demodulated data D1 and D2 can be multiplexed by adding small-scale circuits without using a storing unit (mass memory) for storing the two demodulated data D1 and D2 outputted by the two demodulation parts 101 and 102, the circuit scale and a cost can be reduced by miniaturizing the receiving apparatus 100. In addition, the number of output pins is reduced by the multiplex output so as to reduce the cost by reducing the size of the receiving apparatus. Further, a deterioration of jitter performance and an increment of a response time can be avoided so as to sequentially output the demodulated data without accumulating the demodulated data in the memory.

In addition, in embodiment 1, even when the rates of the demodulated data D1 and D2 are changed or unknown (when the synchronized timing clocks T1 and T2 are changed or unknown), the high-rate timing clock is determined by the rate determining clock 105, and any one of the timing clocks T1 and T2 outputted from the demodulation parts 101 and 102 is selected and outputted as the high-rate timing clock TH by the first selection part 106, based on the determination result. Further, any one of the demodulated data D1 and D2 outputted from the first and second demodulation parts 101 and 102 is outputted as the high-rate demodulated data DH and the other one is outputted as the low-rate demodulated data DL. Therefore, the processing in one system including the multiplexing part 104 and the clock generating part 103 can be performed to reduce the circuit scale.

Further, in embodiment 1, it is possible to easily compare the timing clocks T1 and T2 with the small-scale circuit by using the clock counting units 301 and 302 as the rate determination part 105.

Besides, in embodiment 1, when the two timing clocks T1 and T2 rise simultaneously, the timing clock TLD delayed by the delaying unit 201 is selected as the low-rate timing clock and the rise of the low-rate timing clock is delayed, so that the two demodulated data D1 and D2 can be multiplexed without being easily delayed and the reliability can be improved by delaying a rise time of the low-rate timing clock.

Moreover, varying the predetermined cycle n by the frequencies of the timing clocks T1 and T2 improves jitter performance. For example, a generation part of the initialization signals (control signals C1 and C2) of the clock counting units 301 and 302 can be simplified and the circuit can be further miniaturized by multiplying the cycle n by 2.

In addition, when the rates of the timing clocks T1 and T2 are previously known, the rate determination part 105 and the first selection part 106 are excluded, so as to further miniaturize the circuit. Further, when the rates of the timing clocks T1 and T2 can be identified from outside, the only rate determination part 105 can be omitted from the circuit, so as to miniaturize the circuit.

Further, polarities or the logical values of the control signals indicated in embodiment 1 are determined as shown above.

Embodiment 2

Hereinafter, a receiving apparatus and a receiving method in embodiment 2 of the present invention will be described with reference to FIGS. 5 to 8 and FIG. 3. Same reference numerals are given to components same as those of embodiment 1 in FIGS. 1 and 3.

In embodiment 2, a clock generating part 501 is provided in place of the clock generating part 103 and a multiplexing part 503 is provided in place of the multiplexing part 104.

The clock generating part 501 of embodiment 2 inputs the counting values N1 and N2, the control signals (initialization signals) C1 and C2, and the control signal (identification signal) C3, inputs the high-rate timing clock TH from the first selection part 106, and outputs the high-rate timing clock TH as the high-rate timing clock, so as to generate and output a clock having a same average frequency as a low-rate timing clock TL and synchronized with the timing clock TH as the low-rate timing clock.

In addition, the multiplexing unit 503 of embodiment 2 inputs the high-rate demodulated data DH, the low-rate demodulated data DL and the low-rate timing clock TL from the first selection part 106, inputs the low-rate timing clock from the clock generating part 501, and selects the high-rate demodulated data DH and the low-rate demodulated data DL, based on the inputted low-rate timing clock, so as to generate the multiplexed data in byte-sized increments.

Figure 6:
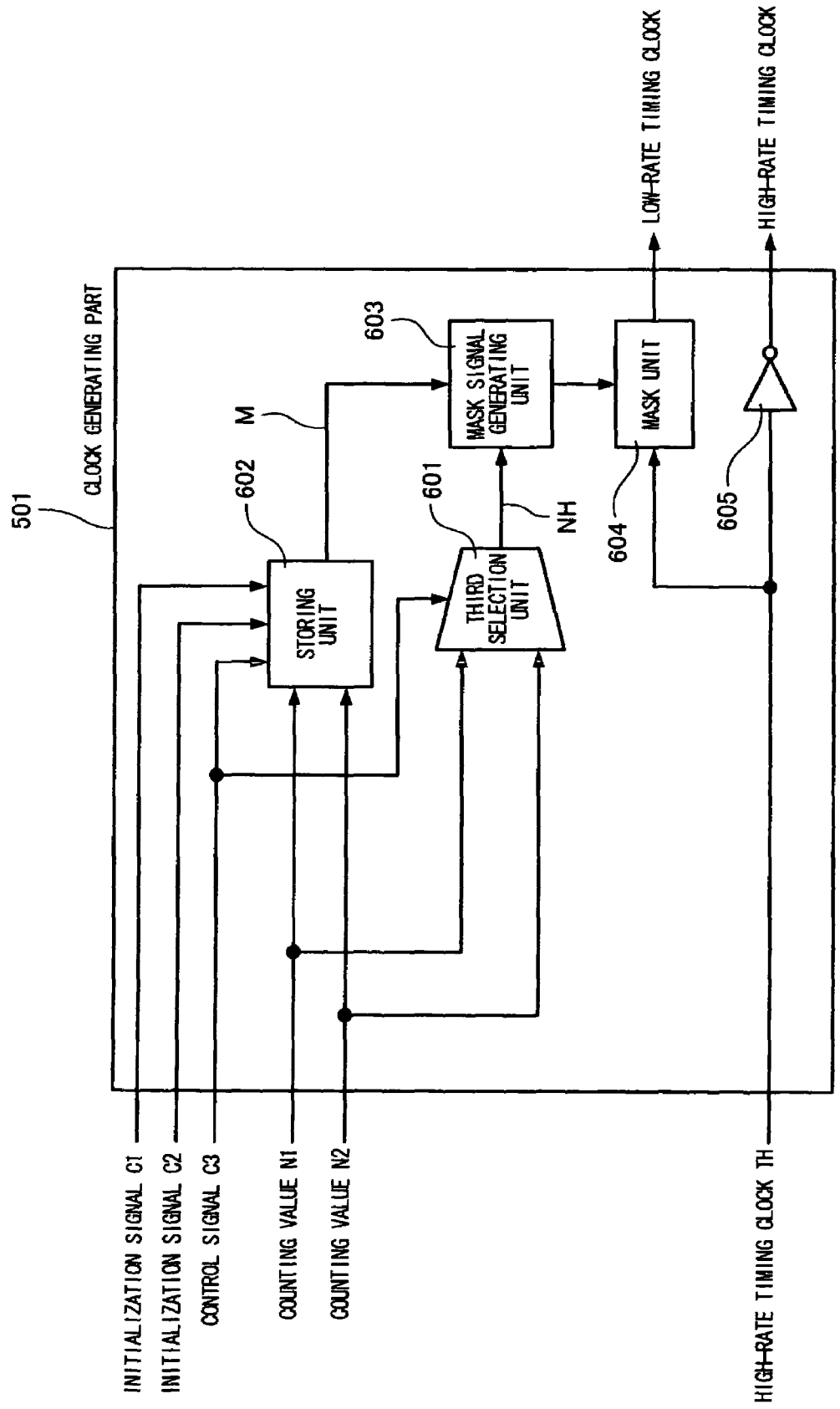
FIG. 6 is a block diagram of a clock generating part of the receiving apparatus.

FIG. 6 shows a specific circuit configuration of the clock generating part 501.

The clock generating part 501 includes a third selection unit 601, a storing unit 602, a mask signal generating unit 603, a mask unit 604 and a logic inverting circuit 605.

The third selection unit 601 inputs the counting values N1 and N2, and the control signal C3 from the rate determination part 105, selects the counting value N1 of the first clock counting unit 301 when the control signal C3 has the logical value "1", that is, the timing clock T1 is high-rate and the counting value N2 of the second clock counting unit 302 when the control signal C3 has the logical value "0", that is, the timing clock T2 is high-rate, and outputs the selected counting values to the mask signal generating unit 603 as the counting value NH.

The storing unit 602 inputs the counting values N1 and N2, the control signals (initialization signals) C1 and C2, and the control signal C3, stores the counting value N2 outputted from the second clock counting unit 302 connected to the low-rate timing clock T2 as a control value M when the control signal C3 has the logical value "1" (when the timing clock T1 is high-rate) and the counting value N1 outputted from the first clock counting unit 301 connected to the low-rate timing clock T1 as the control value M when the control signal C3 has the logical value "0", assuming that the control signals (initialization signals) C1 and C2 are inputted, and outputs the counting values to the mask signal generating unit 603.

The mask signal generating unit 603 inputs the counting value NH outputted from the third selection unit 601 and the control value M outputted from the storing unit 602, and outputs the logical value "1" (an example of the fourth logical value) to the mask unit 604 when the counting value NH of the third selection unit 601 as the mask signal is not larger than the control value M and the logical value "0" (an example of the inverting value of the fourth logical value) when the counting value NH of the third selection unit 604 is larger than the control value M to the mask unit 604.

The mask unit 604 inputs the high-rate timing clock TH outputted from the first selection part 106 and the mask signal outputted from the mask signal generating unit 603, and outputs the high-rate timing clock TH to the A/V decoder 107 and the multiplexing unit 503 as the low-rate timing clock when the mask signal has the logical value "1", and the logical value "L" when the mask signal has the logical value "0".

The logic inverting circuit 605 logic-inverts the high-rate timing clock TH outputted from the first selection part 106 and outputs the high-rate timing clock TH to the A/V decoder 107.

Figure 7:
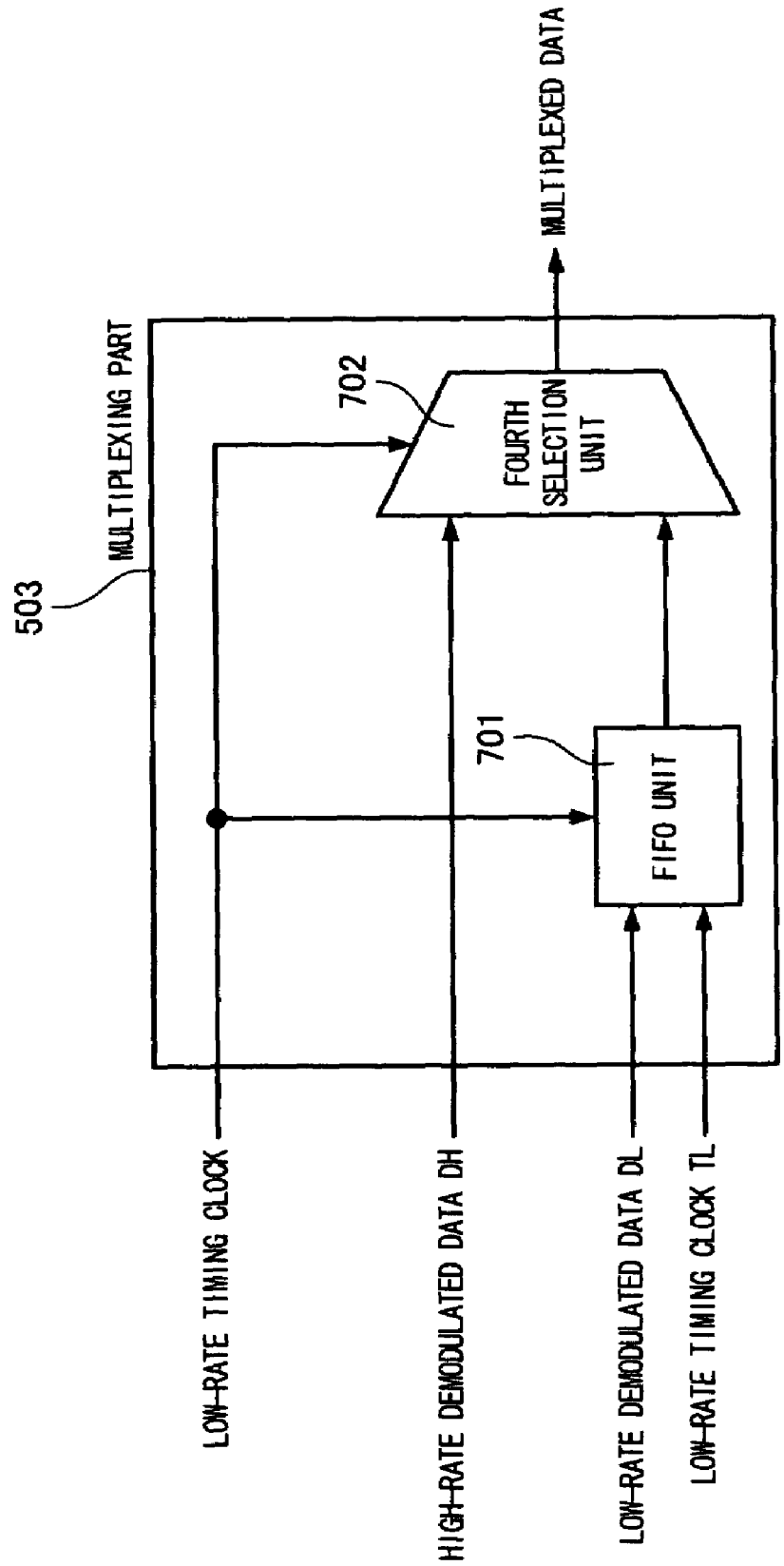
FIG. 7 is a block diagram of a multiplexing part of the receiving apparatus.

FIG. 7 shows a specific circuit configuration of the multiplexing part 503.

The multiplexing part 503 includes a FIFO unit 701 and a fourth selection unit 702 as shown in FIG. 7.

The FIFO unit 701 writes the low-rate demodulated data DL inputted from the first selection part 106 sequentially according to the timing of the low-rate timing clock TL inputted from the first selection part 106, reads the low-rate demodulated data DL according to the timing of the low-rate timing clock outputted from the clock generating part 501, and outputs the low-rate demodulated data DL to the fourth selection unit 702.

The fourth selection unit 702 selects the low-rate demodulated data DL outputted from the FIFO unit 701 when the low-rate timing clock outputted from the clock generating part 501 has the logical value "1" and the high-rate demodulated data DH when the low-rate timing clock has the logical value "0", generates the multiplexed data, and outputs the multiplexed data to the A/V decoder 107.

Figure 8:
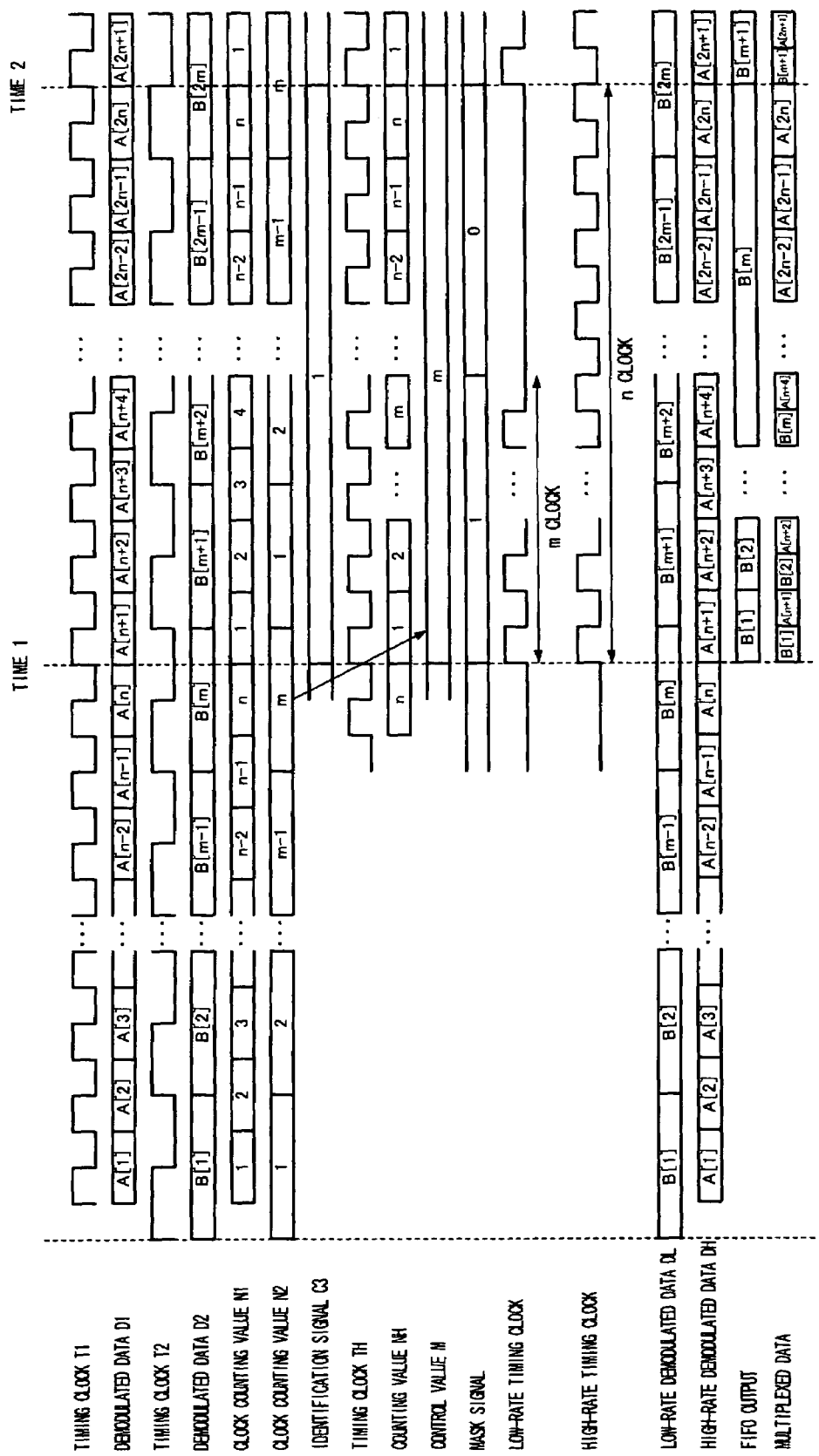
FIG. 8 is a timing diagram showing an operation of the receiving apparatus.

FIG. 8 shows operations of the receiving apparatus configured as shown above.

The storing unit 602 stores the counting output N2 of the second clock counting unit 302 connected to the low-rate timing clock T2 as the control value M when the counting output N1 of the counting unit 301 at the timing 1 or 2 is in the predetermined cycle n. In FIG. 8, m is stored. In addition, the storing unit 602 is updated according to the control signal C1 (initialization timing) of the first clock counting unit 301.

The third selection unit 601 selects the counting value N1 of the first clock counting unit 301 connected to the high-rate timing clock T1 by the control signal C3 and outputs the counting value N1 as the counting value NH.

The mask signal generating unit 603 compares the counting value NH synchronized with and varied on the high-rate timing clock T1 outputted from the selection unit 601 with the control value M stored in the storing unit 602, and outputs the logical value "1" as the mask signal when the counting value NH is not larger than the control value M and the logical value "0" when the counting value NH is larger than the control value M.

The FIFO unit 701 writes the low-rate demodulated data DL at the timing of the low-rate timing clock TL and reads the low-rate demodulated data DL at the timing of the low-rate timing clock. The output of the FIFO unit 701 is synchronized with the low-rate timing clock and, at a burst, outputted as many as the control value M. The fourth selection unit 702 selects the output of the FIFO unit 701 when the low-rate timing clock has the logical value "1" and the high-rate demodulated data DH when the low-rate timing clock has the logical value "0", and outputs the multiplexed data.

As described above, in embodiment 2, the two demodulated data DH and DL outputted by the two demodulation parts 101 and 102 are synchronized by a timing clock synchronized with the high-rate timing clock, and the timings of the multiplexed outputs are equally spaced. A signal processing for processing the multiplexed outputs can be easily performed and an entire configuration of the receiving apparatus can be simplified. Furthermore, since a timing restriction of a latter A/V decoder 107 can be relaxed, a cheap A/V decoder can be used and the receiving apparatus can be inexpensively provided.

Further, in embodiment 2, even though rates of the two demodulated data DH and DL outputted by the two demodulation parts 101 and 102, and the two timing clocks TH and TL synchronized therewith are unknown, the rate determination can be performed for selecting.

Moreover, in embodiment 2, even though the storing unit 602 determines the control value M by using the counting values N1 and N2, the control signals (initialization signals) C1 and C2, and the control signal C3 determined by the rate determination part 105, the clock generating part 501 includes a third clock counting unit which inputs the high-rate timing clock TH and the low-rate timing clock TL from the first selection part 106, and outputs the initialization signals at a cycle when the number of clocks of the high-rate timing clock TH is counted, being initialized, and a fourth clock counting unit which counts the number of clocks of the low-rate timing clock TL, being initialized, whereby the output of the fourth clock counting unit may be stored as the control value M by the initialization signals of the third clock counting unit. Then, the mask signal generating unit 603 inputs the control value M of the storing unit 602 and the counting value of the third clock counting unit, outputs "1" (a fourth logical value) as the mask signal when the counting value of the third clock counting unit is not larger than the control value M and "0" (an inverting value of the fourth logical value) as the mask signal when the counting value of the third clock counting unit is larger than the control value M. In addition, the clock generating part 501 inputs the high-rate timing clock TH and the low-rate timing clock TL from the selection part 106, generates a high-rate timing clock having the same average frequency as the low-rate timing clock TL, and outputs the high-rate timing clock and the low-rate timing clock.

Embodiment 3

Hereinafter, a receiving apparatus in embodiment 3 of the present invention will be described with reference to the drawings. Moreover, same reference numerals are given to components same as those of embodiment shown in FIG. 1 and the description thereof will be omitted.

Figure 9:
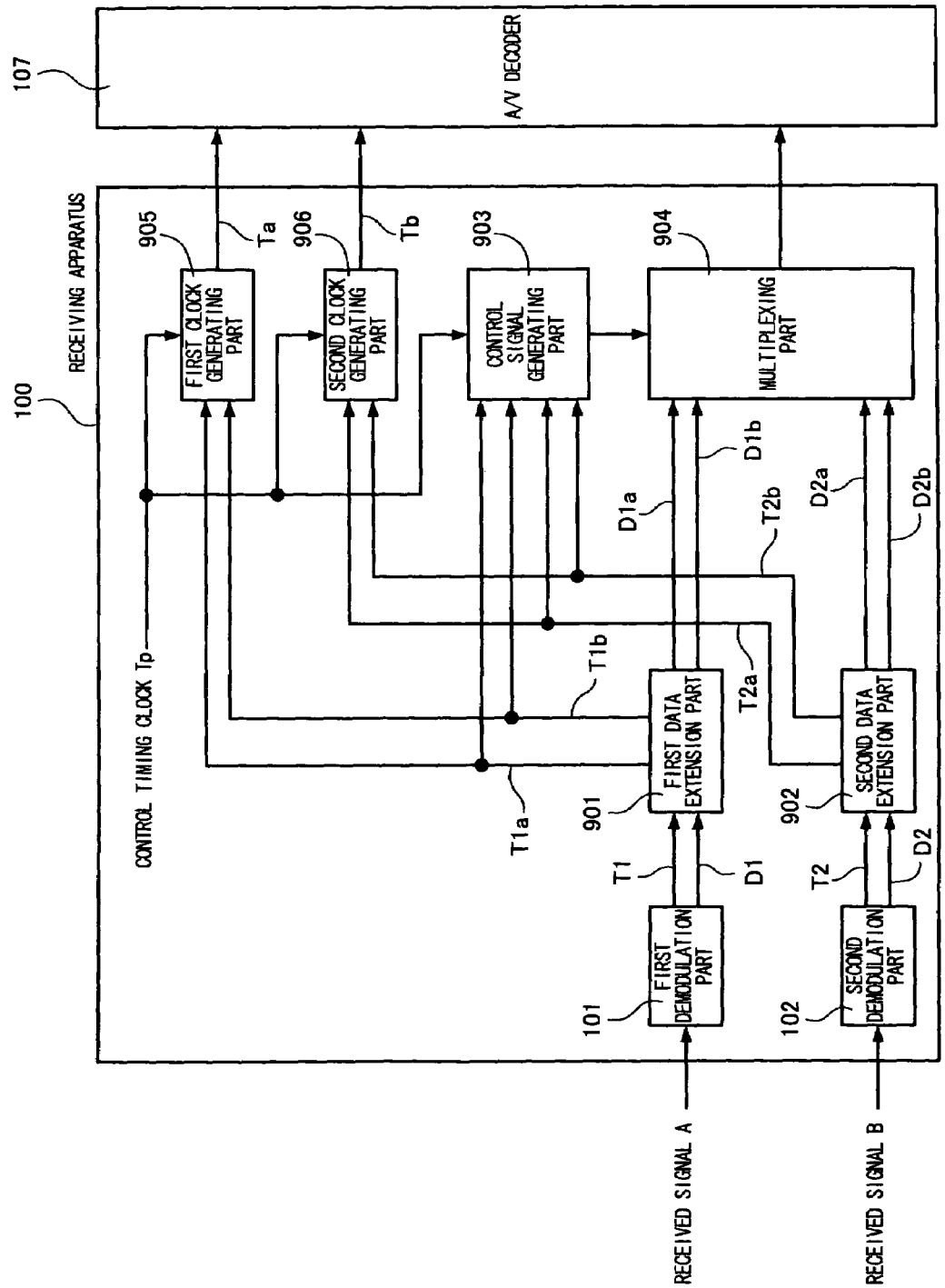
FIG. 9 is a block diagram of a receiving apparatus in embodiment 3 of the present invention.

FIG. 9 is a block diagram of the receiving apparatus in embodiment 3 of the present invention.

A receiving apparatus 100 includes demodulation parts 101 and 102, a first data extension part 901 and a second data extension part 902, a control signal generating part 903, a multiplexing part 904, a first clock generating part 905, and a second clock generating part 906.

The first and second data extension parts 901 and 902 input demodulated data D1 and D2, and timing clocks T1 and T2 respectively synchronized with the demodulated data D1 and D2, respectively outputs the timing clocks T1 and T2 alternatively, and split and output the timing clock T1 and T2 into T1a, T1b, T2a and T2b. Furthermore, the first and second data extension parts 901 and 902 latches the demodulated data D1 synchronized at the respective rises of the timing clocks T1a and T1b, generates the demodulated data D1a and D1b respectively synchronized with the timing clocks T1a and T1b, and latches the demodulated D2 at the respective rises of the timing clocks T2a and T2b and generates and outputs the demodulated data D2a and D2b respectively synchronized with the timing clocks T2a and T2b. That is, two systems including odd-time timing clocks and odd-time demodulated data synchronized therewith, and even-time timing clocks and even-time demodulated data are respectively outputted.

The control signal generating part 903 inputs a control timing clock Tp having a cycle T shorter than the shortest cycle of the timing clocks T1 and T2, and four demodulated timing clocks (timing clocks T1a, T1b, T2a and T2b) outputted from the first and second data extension parts 901 and 902, detects rises of the four demodulated timing clocks by using the control timing clock Tp, and outputs the data control signals (T1a, T1b, T2a and T2b; identification control signals) for identifying the timing clock detecting the rise at a next control timing clock cycle T(N+1) sequentially and when the rise is detected within the control timing clock cycle T(N), and holds and outputs the data control signal when the rise is not detected.

The multiplexing part 904 selects demodulated data D1a, D1b, D2a and D2b synchronized with the data control signals, which are outputted from the data extension parts 901 and 902, based on the data control signals (T1a, T1b, T2a or T2b) outputted from the control signal generating part 903, generates the multiplexed data, and outputs the multiplexed data to the A/V decoder 107.

The clock generating part 905 inputs the timing clock Tp, and the timing clocks T1a and T1b outputted from the first data extension part 901, detects the rises of the timing clocks T1a and T1b at the cycle of the control timing clock by using the control timing clock Tp, generates a first multiplexed timing clock Ta having the rise during the data control signal is outputted within the next cycle T[N+1] when any rise is detected within the control timing clock cycle T[N], and outputs the first multiplexed timing clock Ta to the A/V decoder 107.

The clock generating part 906 inputs the control timing clock Tp, and the timing clocks T2a and T2b outputted from the second data extension part 902, detects the rises of the timing clocks T2a and T2b at the cycle of the control timing clock by using the control timing clock Tp, generates a first multiplexed timing clock Tb having the rise during the data control signal is outputted within the next cycle T[N+1] when any rise is detected within the control timing clock cycle T[N], and outputs the second multiplexed timing clock Ta to the A/V decoder 107.

Figure 10:
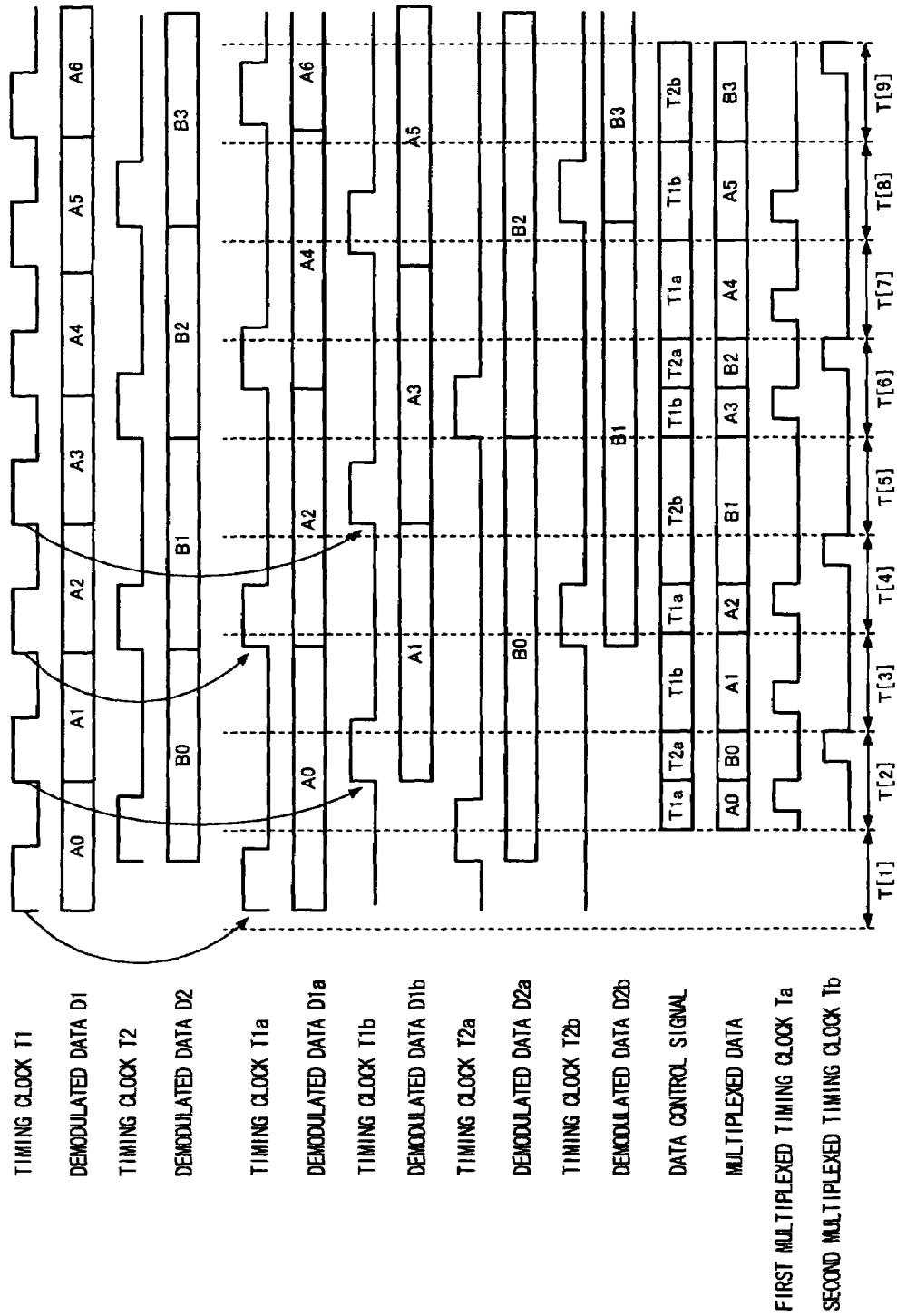
FIG. 10 is a timing diagram showing an operation of the receiving apparatus.

FIG. 10 shows operations of the receiving apparatus configured as described above.

The first data extension part 901 outputs the timing clock T1 alternatively by a cycle, and split and output the timing clock T1 into the timing clocks T1a and T1b. In addition, the first data extension part 901 latches the demodulated data D1 synchronized with the respective rises of the timing clocks T1a and T1b, and generates the demodulated data D1a and D1b respectively synchronized with the timing clocks T1a and T1b. Further, the second data extension part 902 outputs the timing clocks T2a and T2b, and the demodulated data D2a and D2b respectively synchronized with the timing clocks T2a and T2b.

The control signal generating part 903 detects the rises of the four demodulated timing clocks (timing clocks T1a, T1b, T2a and T2b) by using the control timing clock Tp having a cycle shorter than the shortest cycle of the timing clocks T1 and T2. The control signal generating part 903 sequentially outputs the data control signals for identifying the timing clocks of which rises are detected at the next cycle T[N+1] when the rises are detected within a control timing clock cycle T[N] and holds and outputs the data control signals when the rises are not detected.

In FIG. 10, since the timing clocks T1*a* and T2*a* rise at the cycle T[1], the data control signal sequentially outputs T1*a* and T2*a* at the cycle T[2]. Since the timing clocks T1*a* and T2*b* rise at the cycle T[3], the data control signal sequentially outputs T1*a* and T2*b* at the cycle T[4]. Since no timing clock rises at the cycle T[4], the data control signal holds the prior T2*b*.

The multiplexing part 904 selects the demodulated data D1*a*, D1*b*, D2*a* and D2*b* by the data control signal to generate and output the multiplexed data. In FIG. 10, the data control signal having the cycle T[2] represents T1*a* and T2*a*, the contents AO and BO corresponding to D1*a* and D2*a*, respectively, are outputted as the multiplexed data.

The first clock generating part 905 detects the rises of the timing clocks T1*a* and T2*b* at the control timing clock cycle T, and generates and outputs the first multiplexed timing clock Ta having the rise during the output period of the data control signal within the next cycle T[N+1] when detecting the rise of any one within the control timing clock cycle T[N].

The second clock generating part 906 also detects the rises of the timing clocks T2*a* and T2*b* at the control timing clock cycle T[N] similarly to the first clock generating part 905, and generates and outputs the second multiplexed timing clock Tb at the next cycle T[N+1].

As described above, in embodiment 3, by using the control timing clock Tp higher-rate than the timing clocks T1 and T2 to extend the data without detecting the rates of the first and second demodulated data D1 and D2, since the two demodulated data D1 and D2 which operate asynchronously can be easily used with the multiplexed data synchronized with a single clock, the scale of the circuit and the number of the design processes can be reduced.

Moreover, the control timing clock cycle T is 1/m (m=counting numbers $\geq 2$) of the timing clock T1 or T2, whereby the synchronous design can be performed, the improvement of the design efficiency can be further planned.

In addition, it is preferable that the data extending parts 901 and 902 holds the demodulated data at the rises or falls of the timing clocks T1 and T2.

Embodiment 4

Hereinafter, a receiving apparatus in embodiment 4 of the present invention will be described with reference to FIG. 11. Moreover, in FIG. 11, same reference numerals, and a and b for identifying two systems will be given to components same as those in FIG. 1, and the description thereof will be omitted.

Figure 11:
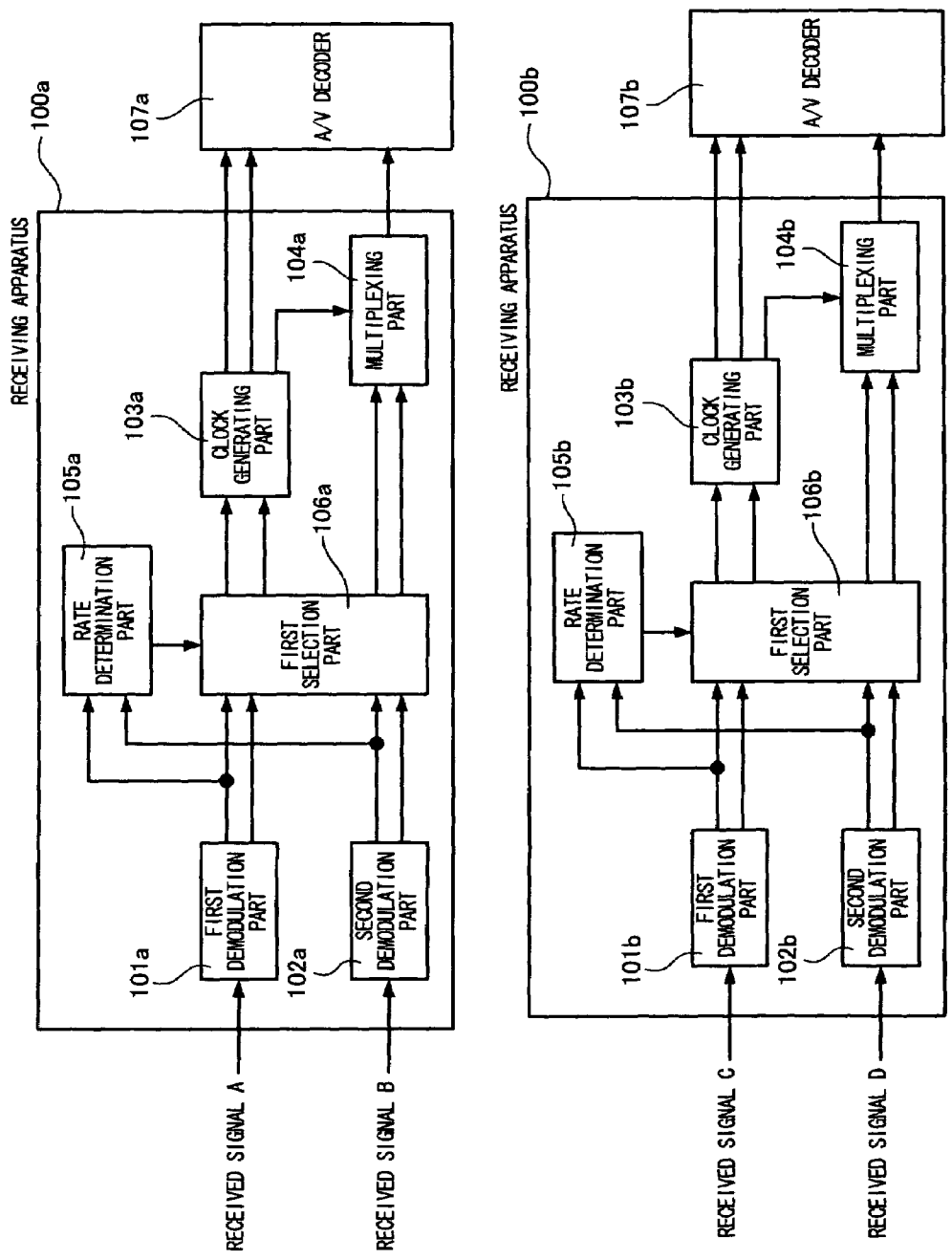
FIG. 11 is a block diagram of a receiving apparatus in embodiment 4 of the present invention.

The receiving apparatus in embodiment 4 of the present invention receiving 4n-type received signals (n=positive integer $\geq 1$; different received signals A, B, C and D in four broad systems in FIG. 11) comprises 2n rows of receiving apparatuses 100 (such as in embodiment 1) (2n rows in FIG. 11) and generates 4n-type timing clock and 2n-type multiplexed data to output the 4n-type timing clock and 2n-type multiplexed data to the A/V decoder 107. Moreover, the receiving apparatus the demodulation parts are suitable for the broadcast systems of the respective received signals.

As described above, in embodiment 4, when the 4n-type received signal received, 2n receiving apparatuses indicated in embodiment 1 are arranged in parallel so as to output the 4n-type received signal as the 2n-type multiplexed data. In addition, the two demodulated data can be multiplexed without using a large-scale memory, the design can be easily performed and increment of the board dimension can be prevented so as to provide the receiving apparatus inexpensively.

Moreover, the receiving apparatus in embodiment 4 has the configuration of the receiving apparatus described in embodiment 1, but may have the configuration of the receiving apparatus in embodiment 2 or 3.

In addition, two demodulation parts are configured as the demodulation part, but the demodulation parts of the respective broadcast systems may be configured.

Further, the different received signals A, B, C and D of the four broadcast systems are adopted as the 4n-type received signal, but the received signals of all the same broadcast systems or of the broadcast system mixing a same broadcast system and a different broadcast system may be adopted as the 4n-type received signal.

Embodiment 5

Hereinafter, a receiving method in embodiment 5 of the present invention will be described with reference to FIGS. 12 and 13.

Figure 12:
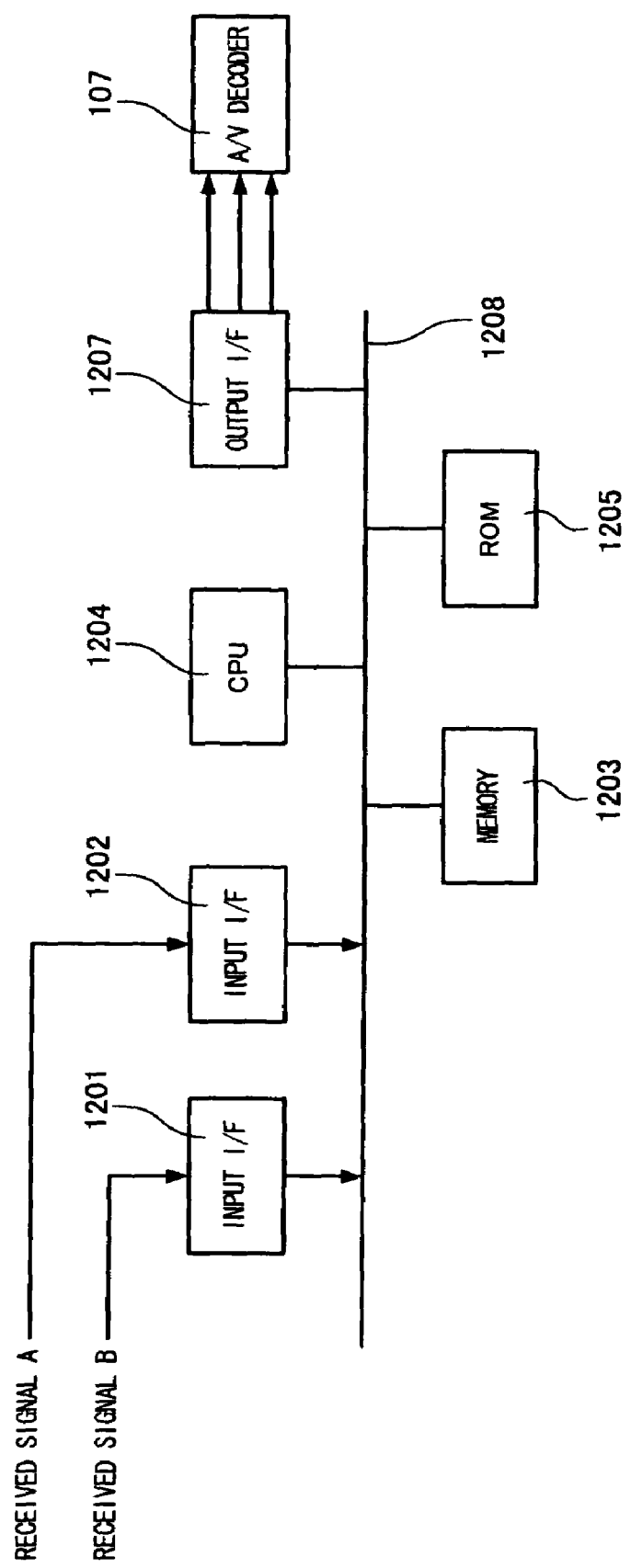
FIG. 12 is a block diagram of a receiving apparatus in embodiment 5 of the present invention.

FIG. 12 is a block diagram of a processor which executes the receiving method of embodiment 5.

In FIG. 12, reference numerals 1201 and 1202 are an input I/F for inputting received signals A and B of the respective broadcast systems. Reference numeral 1203 is a general built-in memory. In addition, reference numeral 1204 is a CPU for performing the control and the operation, and reference numeral 1205 is a ROM for storing a control program. Further, reference numeral 1207 is an output I/F for outputting the demodulated data multiplexing the demodulated data demodulating the respective received signals and the timing clocks respectively synchronized with the demodulated to be multiplexed to the A/V decoder 107. A CPU 1204, a ROM 1205 and an output IF 1207 are connected to the input I/Fs 1201 and 1202 via the built-in memory 1203.

Figure 13:
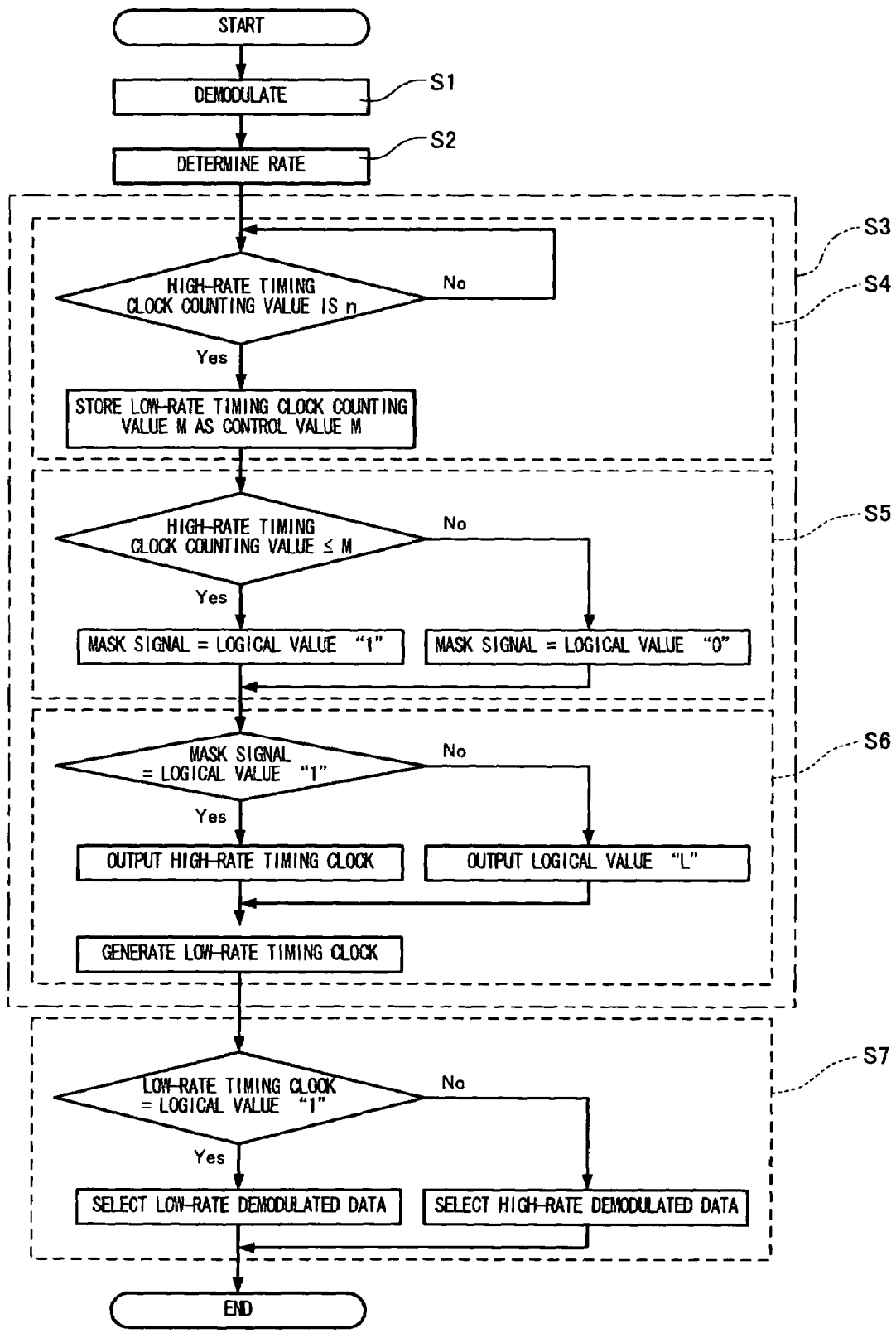
FIG. 13 is a flow chart of a receiving method of the receiving apparatus.

The receiving method by the CPU 1204 is described according to a flow cart of FIG. 13. The CPU 1204 may comprise the components shown in FIG. 1, for example, and the signals of embodiment 1, as shown in FIG. 1, are referenced below referring to FIG. 13.

Step-S1 (Demodulating Step)

First of all, respective received signals A and B are demodulated, based on respective broadcast systems, and respective demodulated data D1 and D2 are generated in a byte so as to generate the timing clocks T1 and T2 synchronized therewith.

Step-S2 (Rate Determining Step)

Next, rates of the two timing clocks T1 and T2 generated in step S1 are determined, and the two timing clocks T1 and T2 are outputted as a high-rate timing clock TH and a low-rate timing clock TL. In addition, the two demodulated data D1 and D2 generated in step S1 are outputted as high-rate demodulated data DH and low-rate demodulated data DL synchronized with the high-rate timing clock TH and the low-rate timing clock TL.

Step-S3 (Clock Generating Step)

Next, a low-rate timing clock having an average frequency same as the low-rate timing clock TL is generated by being synchronized with high-rate timing clock TH.

More specifically, the clock generating step S3 is configured by steps S4 to S6 described below.

Step-S4 (Storing Step)

A counting value of the low-rate timing clock TL counted at every predetermined cycle n of the high-rate timing clock TH is stored as a control value M.

Step-S5 (Mask Signal Generation Processing Step)

Next, when the counting value of the high-rate timing clock TH is not larger than the control value M, a logical value "1"

is outputted and the counting value is larger than the control value M, a logical value "0" is outputted.

Step-S6 (Mask Processing Step)

Next, when a mask signal outputted from step-S5 has a logical value "1", the high-rate timing clock TH is outputted and the mask signal has a logical value "0", a logical value "L" is outputted as the low-rate timing clock.

Step-S7 (Multiplex Processing Step)

Following the clock generating step S3 (S4 to S6), when the low-rate timing clock has a logical value "1", the low-rate demodulated data DL are selected and outputted, and when the low-rate timing clock has a logical value "0", the high-rate demodulated data DH are selected and outputted.

As described above, in embodiment 5, since the two demodulated data D1 and D2 can be multiplexed in a byte by means of the configuration of the general processor, the capacity of the general memory 1203 can be largely reduced, lowering a cost of the receiving apparatus can be realized and the timing clock outputted to the A/V decoder is synchronized with the high-rate timing clock, and the timing restriction of the connected A/V decoder 107 is relaxed, a cost of a whole system can be reduced by using an inexpensive components. In addition, eve though rates of the two demodulated data D1 and D2 outputted by the demodulation processing, and the two timing clocks T1 and T2 synchronized therewith are not known, the two demodulated data D1 and D2 can be multiplexed.

INDUSTRIAL APPLICABILITY

In a receiving apparatus of the present invention, two demodulated data can be multiplexed by adding a small-scale circuit without a large-scale memory, thus a cost reduction by the reduction of the circuit scale and low power consumption can be realized by the reduction of the circuit scale. A timing clock synchronized demodulated data to be multiplexed can be synchronized with high-rate timing clock or a signal timing clock such as a high-rate timing clock, timing restriction of a latter A/V decoder can be relaxed. Thus, a more inexpensive system can be constructed. Consequently, the receiving apparatus can be applied to a system which receives a plurality of broadcast systems at one site in a remote place and widely transmits the received data.

The invention claimed is:

1. A receiving apparatus for receiving two digital broadcast signals from different broadcast systems or a single broadcast system, the receiving apparatus comprising:
    a first demodulation part and a second demodulation part for receiving two such digital broadcast signals, respectively, and for outputting two demodulated data and timing clock signals respectively synchronized with two such demodulated data;
    a clock signal generating part based on said two timing clock signals outputted from the first and second demodulation parts, for generating and outputting such respective timing signals of two such demodulated data and for outputting control signals for multiplexing two such demodulated data; and
    a multiplexing part for multiplexing by a byte two such demodulated data outputted from the first and second demodulation parts, based on such control signals outputted from the clock signal generating part.

2. A receiving apparatus for receiving two digital broadcast signals from different broadcast systems or a single broadcast system, the receiving apparatus comprising:
    a first demodulation part and a second demodulation part for receiving two such digital broadcast signals, respectively, and for outputting two demodulated data and timing clock signals respectively synchronized with two such demodulated data;
    a clock signal generating part based on said two timing clock signals outputted from the first and second demodulation parts, for generating and outputting such respective timing signals of two such demodulated data and for outputting control signals for multiplexing two such demodulated data and for outputting control signals for multiplexing two such demodulated data;
    a multiplexing part for multiplexing by a byte two such demodulated data outputted from the first and second demodulation parts, based on such control signals outputted from the clock signal generating part; and
    a first selection part for receiving from the first and second demodulation parts two such timing clock signals and two such demodulated data, and for selecting and outputting high-rate timing signals and high-rate demodulated data synchronized therewith, and low-rate timing signals and low-rate demodulated data synchronized therewith, alternatively from two such timing signals and two demodulated data outputted from the first and second demodulation parts.

3. The receiving apparatus according to claim 2, further comprising:
    a rate determination part for comparing respective rates of such timing clock signals outputted from the first and second demodulation parts, for determining which clock signal has a higher rate, and for outputting a control signal to the first selection part based on such determination.

4. The receiving apparatus according to claim 3, wherein the rate determination part includes:
    a first clock counting unit and a second clock counting unit for counting a respective number of clocks of two such timing clock signals outputted from the first and second demodulation parts, and for outputting first and second initialization signals, respectively, at a predetermined cycle, each of the first clock counting unit and the second clock counting unit being initialized by the outputting of such first or second initialization signal, respectively; and
    an identification unit for receiving such first and second initialization signals respectively outputted from the first and second clock counting units, and for outputting as a control signal to the first selection part, a first logical value when an output of such first initialization signal is received before or simultaneously with such second initialization signal, and for outputting an opposite value of the first logical value when such second initialization signal is received before such first initialization signal.

5. The receiving apparatus according to claim 2, wherein the clock signal generating part includes:
    an edge detecting unit for receiving and outputting a high-rate timing clock signal outputted from the first selection part, for detecting simultaneous rises of a high-rate timing clock signal and a low-rate timing clock signal outputted from the first selection part, and for outputting a second logical value when rises of a high-rate timing clock signal and a low-rate timing clock signal are simultaneous, and an opposite value of the second logical value when such rises are not simultaneous as a selection signal;
    a delaying unit for receiving a low-rate timing clock signal from the first selection part, and for outputting a delayed low-rate timing clock signal;

a second selection unit that for receiving a low-rate timing clock signal outputted from the first selection part and a delayed low-rate timing clock signal delayed by the delaying unit, for selecting as an output such low-rate timing clock signal delayed by the delaying unit when the selection signal from the edge detecting unit has the second logical value, and for selecting as an output a low-rate timing clock signal outputted from the first selection part when the selection signal from the edge detecting unit has the opposite value of the second logical value; and a control signal generating unit for receiving a high-rate timing clock signal and a low-rate timing clock signal outputted from the second selection unit, for outputting to the multiplexing part as a control signal for multiplexing two demodulated data a third logical value when a high-rate timing clock signal rises, for outputting as a control signal an opposite value of the third logical value when a low-rate timing clock signal rises, and for holding an output value when a rise does not occur on either of a high-rate timing clock signal or a low-rate timing clock signal.

6. A receiving apparatus for receiving two digital broadcasting signals from different broadcast systems or from a single broadcasting system, the receiving apparatus comprising:

a first demodulating part and a second demodulating part for respectively receiving two such digital broadcasting signals, and for outputting demodulated data thereof and timing clock signals respectively synchronized with such demodulated data, one of such timing clock signals being a first low-rate timing clock signal and another of such timing clock signals being a first high-rate timing clock signal;

a clock signal generating part for outputting a second high-rate timing clock signal corresponding to a first high-rate timing clock signal outputted from the first and second demodulation parts and a second low-rate timing clock signal having a same average frequency as a first low-rate timing clock signal outputted from the first and second demodulation parts, a second low-rate timing clock signal being synchronized with the second high-rate timing clock signal; and a multiplexing part that multiplexes, by a byte, demodulated data outputted from the first and second demodulation parts, based on said second low-rate timing clock signal outputted from the clock generating part.

7. A receiving apparatus for receiving two digital broadcasting signals from different broadcast systems or from a single broadcasting system, the receiving apparatus comprising:

a first demodulating part and a second demodulating part for respectively receiving two such digital broadcasting signals, and for outputting demodulated data thereof and timing clock signals respectively synchronized with such demodulated data, one of such timing clock signals being a first low-rate timing clock signal and another of such timing clock signals being a first high-rate timing clock signal;

a clock signal generating part for outputting a second high-rate timing clock signal corresponding to a first high-rate timing clock signal outputted from the first and second demodulation parts and a second low-rate timing clock signal having a same average frequency as a first low-rate timing clock signal outputted from the first and second demodulation parts, a second low-rate timing clock signal being synchronized with the second high-rate timing clock signal;

a multiplexing part that multiplexes, by a byte, demodulated data outputted from the first and second demodulation parts, based on said second low-rate timing clock signal outputted from the clock generating part;

a first clock counting part and a second clock counting part, each for counting a respective number of clock signals of two such timing clock signals outputted from the first and second demodulation parts and for outputting a first and second counted number, each counted number having a respective counting value, and for outputting a first initialization signal and a second initialization signal at a predetermined cycle, each of the first and second clock counting parts being initialized by the outputting of a respective initialization signal;

an identification part for receiving as inputs such first and second initialization signals respectively outputted from the first and second clock counting parts, and for outputting a control signal with a first logical value when such first initialization signal is received before or simultaneously with such second initialization signal, and for outputting a control signal with an opposite value of the first logical value when such second initialization signal is received before such first initialization signal; and a first selection part for receiving such first and second demodulated data and first and second timing clock signals, associated with such digital broadcast signals, from the first and second demodulation parts, and for outputting a first timing clock signal as the high-rate timing clock signal and first demodulated data as the high-rate demodulated data when such control signal has the first logical value, and for outputting such second demodulated data as the high-rate demodulated data when such control signal has the opposite value of the first logical value.

8. The receiving apparatus according to claim 7, wherein the clock signal generating part includes:

a third selection unit for receiving first and second counting values from the first and second clock counting parts, and a control signal from the identification part, and for outputting a third counting value corresponding to a counting value of the first clock counting part when such control signal has the first logical value, and corresponding to a counting value of the second clock counting part when such control signal has the opposite value of the first logical value;

a storing unit for receiving first and second counting values, first and second initialization signals, and a control signal from the identification part, and for storing and outputting a counting value of the second clock counting value as a control value when such control signal has the first logical value, and for storing and outputting a control value corresponding to the counting value of the first clock counting value when such control signal has the opposite value of the first logical value;

a mask signal generating unit for receiving a control value from the storing unit and a third counting value from the third selection unit, and for outputting a mask signal corresponding to a fourth logical value when the third counting value is not larger than the control value, and for outputting such mask signal corresponding to an opposite value of the fourth logical value when the counting value of the third selection unit is larger than the control value;

a mask unit for receiving such mask signal from the mask signal generating unit and a high-rate timing clock signal from the selection part, for outputting a timing clock signal corresponding to such high-rate timing clock signal when such mask signal has the fourth logical value, and for outputting a logical value "L" low-rate timing clock when the mask signal has the opposite value of the fourth logical value; and a logic inverting circuit that logic-inverts a high-rate timing clock signal outputted from the first selection part, and outputs a logic-inverted clock signal as a high-rate timing clock signal.

9. A receiving apparatus for receiving first and second digital broadcasting signals from different broadcast systems or a single broadcast system, the receiving apparatus comprising:

a first demodulation part and a second demodulation part for respectively receiving first and second digital broadcasting signals, and for outputting demodulated data and timing signals respectively synchronized with the demodulated data of such first and second digital broadcast signals;

a first data extension part for receiving demodulated data and a timing clock signal from the first demodulation part, and for outputting first odd-time timing clock signals and first odd-time demodulated data synchronized therewith, and first even-time timing clock signals and first even-time demodulated data synchronized therewith;

a second data extension part for receiving demodulated data and timing clock signals from the second demodulation part, and for outputting second odd-time timing signals and second odd-time demodulated data synchronized therewith, and second even-time timing signals and second even-time demodulated data synchronized therewith;

a control signal generating part for receiving first and second odd-time timing clock signals and first and second even-time timing clock signals from the first and second data extension parts, and a control timing clock signal having a cycle not larger than a shortest cycle of all such timing clock signals outputted from the first and second demodulation parts, for detecting a rise of first and second odd-time timing clock signals and first and second even-time timing clock signals from the first and second data extension parts within the control timing clock cycle, and for outputting an identification control signal in a next cycle after a cycle in which a rise is detected;

a multiplexing part for selecting, based on an identification control signal outputted from the control signal generating part, demodulated data synchronized with such identification control signal and outputted from the first and second data extension parts;

a first clock signal generating part for receiving a first odd-time timing clock signal, a first even-time timing clock signal, and a control timing clock signal, for detecting a rise of such first odd-time timing clock or such first even-time timing clock within a control timing clock cycle, and for generating a first multiplexed timing clock signal having a rising edge within a next cycle of such identification control signal; and a second clock signal generating part for receiving a second odd-time timing clock signal, a second even-time timing clock signal, and a control timing clock signal, for detecting a rise of such second odd-time timing clock signal or such second even-time timing clock signal within the control timing clock cycle, and for generating a second multiplexed timing clock signal having a rising edge within a next cycle of such identification control signal.

10. A receiving apparatus comprising 2n (n=positive integer $\geq 1$) units of receiving apparatuses according to claim 1 arranged in parallel, wherein the receiving apparatus inputs 4n-type received signal, and generates and outputs 4n-type timing clock signals and 2n-type multiplexed data.

11. A receiving apparatus comprising:

receiving apparatus according to claim 1; and a video signal processing device that inputs multiplexed data of two demodulated data outputted from the receiving apparatus and respective timing clock signals of the multiplexed two demodulated data, and uses at least one of the two demodulated data out of the multiplexed data as received data.

12. A method of receiving two digital broadcasting signals from different broadcast systems or a single broadcast system, the method comprising:

providing a receiving apparatus comprising inputs for receiving digital broadcast signals, at least one memory for storing instructions and data, at least one CPU for executing instructions, and at least one output;

receiving two digital broadcasting signals at the inputs of the receiving apparatus;

demodulating the two digital broadcasting signals according to the broadcast system sending the signal;

generating demodulated data of each of the two received signals by a byte;

generating two timing clock signals respectively synchronized with the two digital broadcasting signals;

determining rates of the two generated timing clock signals;

outputting two timing clock signals corresponding to the two generated timing clock signals, respectively, as a high-rate timing clock signal and a low-rate timing clock signal, and outputting the two generated demodulated data as high-rate demodulated data and low-rate demodulated data synchronized with the high-rate timing clock signal and the low-rate timing clock signal, respectively;

storing a counting value of the low-rate timing clock signal counted at every predetermined cycle of the high-rate timing clock signal as a control value;

outputting as a mask value a logical value "1" when the counting value of the high-rate timing clock signal is not larger than the stored control value and a logical value "0" when the counting value is larger than the control value;

outputting the high-rate timing clock signal when the mask signal has a logical value "1", and the logical value "L" as the low-rate timing clock signal when the low-rate timing clock signal has a logical value "0"; and selecting and outputting at the output of the receiving apparatus the low-rate demodulated data when the low-rate timing clock signal has a logical value "1", and the high-rate demodulated data when the low-rate timing clock signal has a logical value "0".

* * * * *